US008758129B2

(12) United States Patent
Huang et al.

(10) Patent No.: US 8,758,129 B2
(45) Date of Patent: Jun. 24, 2014

(54) GAMING SYSTEM AND METHOD OF GAMING IN WHICH SYMBOL REELS SELECTIVELY ROTATE IN LESS THAN A FULL ROTATION

(75) Inventors: Douglas Da Huang, Las Vegas, NV (US); Scott Monroe Stewart, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/253,203

(22) Filed: Oct. 5, 2011

(65) Prior Publication Data

US 2012/0115567 A1 May 10, 2012

Related U.S. Application Data

(60) Provisional application No. 61/390,411, filed on Oct. 6, 2010.

(51) Int. Cl.
*A63F 13/00* (2014.01)

(52) U.S. Cl.
USPC .................. 463/31; 463/16; 463/17; 463/18; 463/19; 463/20; 463/30; 463/36

(58) Field of Classification Search
USPC .................................. 463/16–20, 30–31, 36
See application file for complete search history.

(56) References Cited

U.S. PATENT DOCUMENTS 4,321,673 A 3/1982 Hawwass et al.
5,251,898 A * 10/1993 Dickenson et al. ....... 273/143 R
7,033,272 B1 4/2006 Mason
7,509,897 B2 3/2009 Kammermeier et al.
7,665,937 B2 2/2010 Kammermeier et al.
7,806,763 B2 * 10/2010 Walker et al. .................. 463/20
8,047,910 B2 * 11/2011 Isaac et al. ...................... 463/20
2004/0048651 A1 * 3/2004 Vorias et al. .................... 463/20
2005/0043092 A1 * 2/2005 Gauselmann .................. 463/36
2006/0172794 A1 * 8/2006 Walker et al. .................. 463/20
2006/0258436 A1 11/2006 McBride
2006/0276245 A1 * 12/2006 Walker et al. .................. 463/20
2007/0293297 A1 12/2007 Schugar
2008/0113761 A1 5/2008 Belger et al.
2008/0119260 A1 * 5/2008 Nores ............................ 463/20

(Continued)

FOREIGN PATENT DOCUMENTS

CA 1336540 8/1995
CA 2325153 A1 5/2002

(Continued)

*Primary Examiner* — Dmitry Suhol
*Assistant Examiner* — David Duffy
(74) *Attorney, Agent, or Firm* — McAndrews, Held & Malloy, Ltd.

(57) ABSTRACT

A gaming system is disclosed that comprises a plurality of rotatable reels, each reel comprising a plurality of selectable symbols corresponding to respective reel stopping positions. The system includes a symbol selector arranged to select a stopping position for each reel and thereby select at least one symbol from each reel, and a reel controller arranged to control rotation of the reels such that the reels rotate during implementation of a game in order to move the reels to the selected stopping positions and thereby display the selected symbols in a display area. The reel controller is arranged to control rotation of the reels such that each reel rotates less than one full rotation to the selected reel stopping position. A corresponding method of gaming is also disclosed.

18 Claims, 7 Drawing Sheets

(56) References Cited

U.S. PATENT DOCUMENTS

| | | | | |
|---|---|---|---|---|
| 2008/0171587 | A1 | 7/2008 | Jackson | |
| 2008/0200233 | A1 | 8/2008 | Aida | |
| 2009/0104969 | A1 | 4/2009 | Paulsen et al. | |
| 2009/0143134 | A1 | 6/2009 | Anderson et al. | |
| 2009/0239636 | A1 | 9/2009 | Lankots | |
| 2011/0118006 | A1* | 5/2011 | Acres | 463/25 |

FOREIGN PATENT DOCUMENTS

| | | | |
|---|---|---|---|
| CA | 2545663 | A1 | 11/2006 |
| CN | 86206461 | U | 12/1987 |
| CN | 2250790 | Y | 4/1997 |
| CN | 2294091 | Y | 10/1998 |
| CN | 2331395 | Y | 8/1999 |
| CN | 2593855 | Y | 12/2003 |
| CN | 2618163 | | 5/2004 |
| CN | 2629624 | | 8/2004 |
| CN | 2650825 | Y | 10/2004 |
| CN | 2686676 | Y | 3/2005 |
| CN | 201070532 | Y | 6/2008 |
| CN | 201127745 | | 10/2008 |
| CN | 101507876 | A | 8/2009 |
| DE | 3338436 | | 5/1985 |
| DE | 3735322 | C1 | 12/1988 |
| GB | 190612018 | A | 0/1907 |
| GB | 190703216 | A | 0/1907 |
| GB | 191000278 | A | 0/1910 |
| GB | 191201075 | A | 0/1913 |
| GB | 191321811 | | 0/1914 |
| GB | 191322003 | A | 0/1914 |
| GB | 190218669 | A | 6/1903 |
| GB | 190318366 | A | 1/1904 |
| GB | 109488 | A | 9/1917 |
| GB | 145815 | A | 6/1920 |
| GB | 172489 | A | 12/1921 |
| GB | 211695 | A | 2/1924 |
| GB | 252437 | A | 5/1926 |
| GB | 257521 | A | 9/1926 |
| GB | 281064 | A | 12/1927 |
| GB | 299544 | A | 11/1928 |
| GB | 306516 | A | 2/1929 |
| GB | 347462 | A | 4/1931 |
| GB | 428001 | A | 5/1935 |
| GB | 432663 | A | 7/1935 |
| GB | 436974 | A | 10/1935 |
| GB | 439647 | A | 12/1935 |
| GB | 446316 | A | 4/1936 |
| GB | 635146 | A | 4/1950 |
| GB | 818149 | A | 8/1959 |
| GB | 1076166 | A | 7/1967 |
| GB | 1193768 | A | 6/1970 |
| GB | 1205231 | | 9/1970 |
| GB | 1207457 | A | 10/1970 |
| GB | 1262134 | A | 2/1972 |
| GB | 1268104 | A | 3/1972 |
| GB | 1321274 | | 6/1973 |
| GB | 1328502 | A | 8/1973 |
| GB | 1454046 | A | 10/1976 |
| GB | 1475388 | A | 6/1977 |
| GB | 2067807 | A | 7/1981 |
| GB | 2090690 | A | 7/1982 |
| GB | 2090690 | B | 4/1984 |
| GB | 2311766 | A | 10/1997 |
| GB | 2387552 | A | 10/2003 |
| GB | 2387949 | A | 10/2003 |
| GB | 2387552 | B | 7/2006 |
| JP | 54031328 | A | 3/1979 |
| JP | 54031329 | A | 3/1979 |
| JP | 54031330 | | 3/1979 |
| JP | 54081803 | | 6/1979 |
| JP | 63017196 | | 1/1988 |
| JP | 3003734 | A | 1/1991 |
| JP | 3112578 | A | 5/1991 |
| JP | 3267788 | | 11/1991 |
| JP | 4120492 | | 4/1992 |
| JP | 5278624 | | 10/1993 |
| JP | 6319845 | A | 11/1994 |
| JP | 7265466 | A | 10/1995 |
| JP | 8024414 | A | 1/1996 |
| JP | 8323009 | A | 12/1996 |
| JP | 9173527 | A | 7/1997 |
| JP | 10263198 | A | 10/1998 |
| JP | 2874910 | B2 | 3/1999 |
| JP | 2000116897 | A | 4/2000 |
| JP | 2000312745 | A | 11/2000 |
| JP | 2000312746 | A | 11/2000 |
| JP | 2001204877 | A | 7/2001 |
| JP | 2002085772 | A | 3/2002 |
| JP | 2003038802 | A | 2/2003 |
| JP | 2003159372 | A | 6/2003 |
| JP | 2004065349 | A | 3/2004 |
| JP | 2004081272 | A | 3/2004 |
| JP | 2004147956 | A | 5/2004 |
| JP | 2004215844 | A | 8/2004 |
| JP | 2004267319 | A | 9/2004 |
| JP | 2004275239 | A | 10/2004 |
| JP | 2005152122 | A | 6/2005 |
| JP | 2005152123 | A | 6/2005 |
| JP | 2005152124 | A | 6/2005 |
| JP | 2005152125 | A | 6/2005 |
| JP | 2005152126 | A | 6/2005 |
| JP | 2005204980 | A | 8/2005 |
| JP | 2006000510 | A | 1/2006 |
| JP | 2006000511 | A | 1/2006 |
| JP | 2006026127 | A | 2/2006 |
| JP | 2006068240 | A | 3/2006 |
| JP | 2006305172 | A | 11/2006 |
| JP | 2006340805 | A | 12/2006 |
| JP | 2007029365 | A | 2/2007 |
| JP | 2007029622 | A | 2/2007 |
| JP | 2007075256 | A | 3/2007 |
| JP | 3904220 | | 4/2007 |
| JP | 2007101255 | | 4/2007 |
| JP | 2007159830 | A | 6/2007 |
| JP | 2007260087 | A | 10/2007 |
| JP | 2007260088 | A | 10/2007 |
| JP | 2008018146 | A | 1/2008 |
| JP | 2008178728 | A | 8/2008 |
| JP | 2008229397 | A | 10/2008 |
| JP | 2008264235 | A | 11/2008 |
| JP | 2009106571 | A | 5/2009 |
| JP | 2009112329 | A | 5/2009 |
| JP | 2009148502 | A | 7/2009 |
| JP | 2009148503 | A | 7/2009 |
| JP | 2009148504 | A | 7/2009 |
| JP | 2009148505 | A | 7/2009 |
| JP | 2009160206 | A | 7/2009 |
| JP | 2009160207 | A | 7/2009 |
| JP | 2009160208 | A | 7/2009 |
| JP | 2009160209 | A | 7/2009 |
| KR | 20060116643 | A | 11/2006 |
| KR | 20090058276 | | 6/2009 |
| TW | 544330 | B | 8/2003 |
| WO | 0048689 | A1 | 8/2000 |
| WO | 0120489 | A1 | 3/2001 |
| WO | 2008060885 | A1 | 5/2008 |

* cited by examiner

GAMING SYSTEM AND METHOD OF GAMING IN WHICH SYMBOL REELS SELECTIVELY ROTATE IN LESS THAN A FULL ROTATION

RELATED APPLICATIONS

This application claims priority to U.S. Provisional Application No. 61/390,411, having a filing date of Oct. 6, 2010, which is also incorporated herein by reference in its entirety.

BACKGROUND OF THE INVENTION

The present invention relates to a gaming system and to a method of gaming.

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device.

In a conventional gaming system, the reels are generally rotated and controlled so that the reels stop in a sequence commencing with a leftmost reel and ending with a rightmost reel. With such a gaming system, the rightmost reel will typically spin 3 or more revolutions more than the leftmost reel. This process is desirable for some games, but for games with a large number of free spins, this can be very time consuming and tedious for a player.

BRIEF SUMMARY OF THE INVENTION

In accordance with a first aspect of the present invention, there is provided a gaming system comprising:

a plurality of rotatable reels, each reel comprising a plurality of selectable symbols corresponding to respective reel stopping positions;

a symbol selector arranged to select a stopping position for each reel and thereby select at least one symbol from each reel; and a reel controller arranged to control rotation of the reels such that the reels rotate during implementation of a game in order to move the reels to the selected stopping positions and thereby display the selected symbols in a display area;

wherein the reel controller is arranged to control rotation of the reels such that each reel rotates less than one full rotation to the selected reel stopping position.

In one embodiment, the reel controller is arranged to control rotation of the reels such that each reel rotates in a direction to the selected reel stopping position determined by the smallest amount of rotation required to the selected reel stopping position.

In one embodiment, if a reel already shows a selected symbol, the reel controller may be arranged to not rotate the reel.

In one embodiment, the reel controller is arranged to control rotation of the reels such that for reels that are required to rotate in order to move to a selected reel stopping position, all reels rotate in the same direction.

In one embodiment, the reel controller is arranged to control rotation of the reels such that for reels that are required to rotate in order to move to a selected stopping position, all reels rotate in randomly determined directions.

In one embodiment, the reel controller is arranged to control rotation of the reels such that for reels that are required to rotate in order to move to a selected stopping position, the reels rotate simultaneously.

In one embodiment, the reel controller is arranged to control rotation of the reels such that for reels that are required to rotate in order to move to a selected stopping position, the reels rotate in a defined sequence.

In one arrangement, the defined sequence is randomly determined.

In one embodiment, the gaming system is arranged to operate in a first mode wherein all reels do not rotate less than one full rotation in order to move to a selected stopping position, and a second mode wherein all reels rotate less than one full rotation in order to move to a selected stopping position.

In one embodiment, the gaming system is arranged to operate in the second mode in response to player input.

In one embodiment, the gaming system is arranged to operate in the second mode in response to a game condition.

In one embodiment, the gaming system is arranged to implement a base game during the first mode and to implement a feature game during the second mode.

The game condition may be a trigger condition such as display of at least one trigger symbol, such as a wild symbol. Alternatively, the trigger condition may be display of a particular combination of trigger symbols such as scattered predefined symbols or a particular combination of adjacently disposed symbols along a win line.

The gaming system may be implemented as a stand alone gaming machine or across a network.

In accordance with a second aspect of the present invention, there is provided a method of gaming comprising:

providing a plurality of rotatable reels, each reel comprising a plurality of selectable symbols corresponding to respective reel stopping positions;

selecting a stopping position for each reel and thereby at least one symbol from each reel; and controlling rotation of the reels such that the reels rotate during implementation of a game in order to move the reels to the selected stopping positions and thereby display the selected symbols in a display area, each reel rotating less than one full rotation to the selected reel stopping position.

In accordance with a third aspect of the present invention, there is provided a computer program arranged when loaded into a computer to instruct the computer to operate in accordance with a gaming system according to the first aspect of the present invention.

In accordance with a fourth aspect of the present invention, there is provided a computer readable medium having computer readable program code embodied therein for causing a computer to operate in accordance with a gaming system according to the first aspect of the present invention.

In accordance with a fifth aspect of the present invention, there is provided a data signal having computer readable program code embodied therein for causing a computer to operate in accordance with a gaming system according to the first aspect of the present invention.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
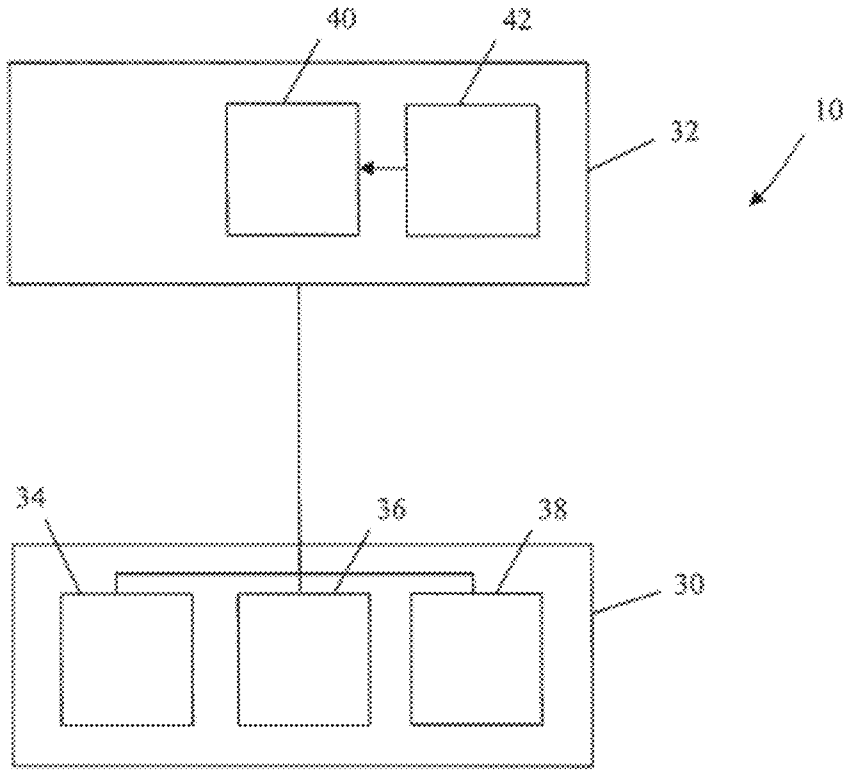
FIG. 1 is a schematic block diagram of core components of a gaming system in accordance with an embodiment of the present invention.

Referring to the drawings, there is shown a schematic block diagram of a gaming system 10 arranged to implement a probabilistic game, in this example of the type wherein several symbols from a set of symbols are randomly displayed, and a game outcome is determined on the basis of the displayed symbols. With some such probabilistic games, the set of symbols include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same win line, scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions. The available win lines may be fixed, may be determined on the basis of the bet placed, or may be selectable by a player.

This type of game often also comprises a base game mode and a special game mode, with special game mode being triggered when a specific trigger condition occurs during base game mode. For example, base game mode may implement a base game wherein a plurality of symbols are selected for use in determining game outcomes from a set of symbols, and special game mode may implement a feature game with the feature game being triggered when a particular symbol or combination of symbols is displayed.

In a conventional gaming system having a plurality of rotatable symbol bearing reels, the reels are generally rotated and controlled so that the reels stop in a sequence commencing with a leftmost reel and ending with a rightmost reel. In one such gaming system, all reels initially spin in a downward direction, and after at least one complete reel revolution the leftmost first reel stops. After at least one more revolution, the next reel to the right, the second reel, stops, and similarly after a further revolution, the next reel to the right, the third reel, stops, and so on. In a gaming system having 3 reels, the third reel will spin typically 3 or more revolutions more than the first reel. This process is generally desirable for base games, but for games with a large number of free spins, this can be very time consuming and tedious for a player.

The present gaming system operates such that, at least during a portion of a game implemented by the gaming system, the reels are caused to rotate such that each reel moves less than one full revolution in order to display a selected symbol. In one embodiment, the reels are controlled so that the reels rotate the smallest amount up or down in order to display the selected symbol. In another embodiment, the reels are controlled such that the reels move in the same direction up or down and rotate the smallest amount in the up or down direction in order to display the selected symbols.

One example of selecting symbols is for a symbol selector to select symbols for display by selecting a reel stopping position. For this purpose, it is known to use a probability table stored in memory so as to vary the odds of a particular stop position being selected. Other techniques can be used to control the odds of particular outcomes occurring to thereby control the return to player of the game.

Referring to FIG. 1, a schematic diagram of core components of a gaming system 10 is shown. The core components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game playing instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or any computational device such as a personal computer or a server.

Figure 2:
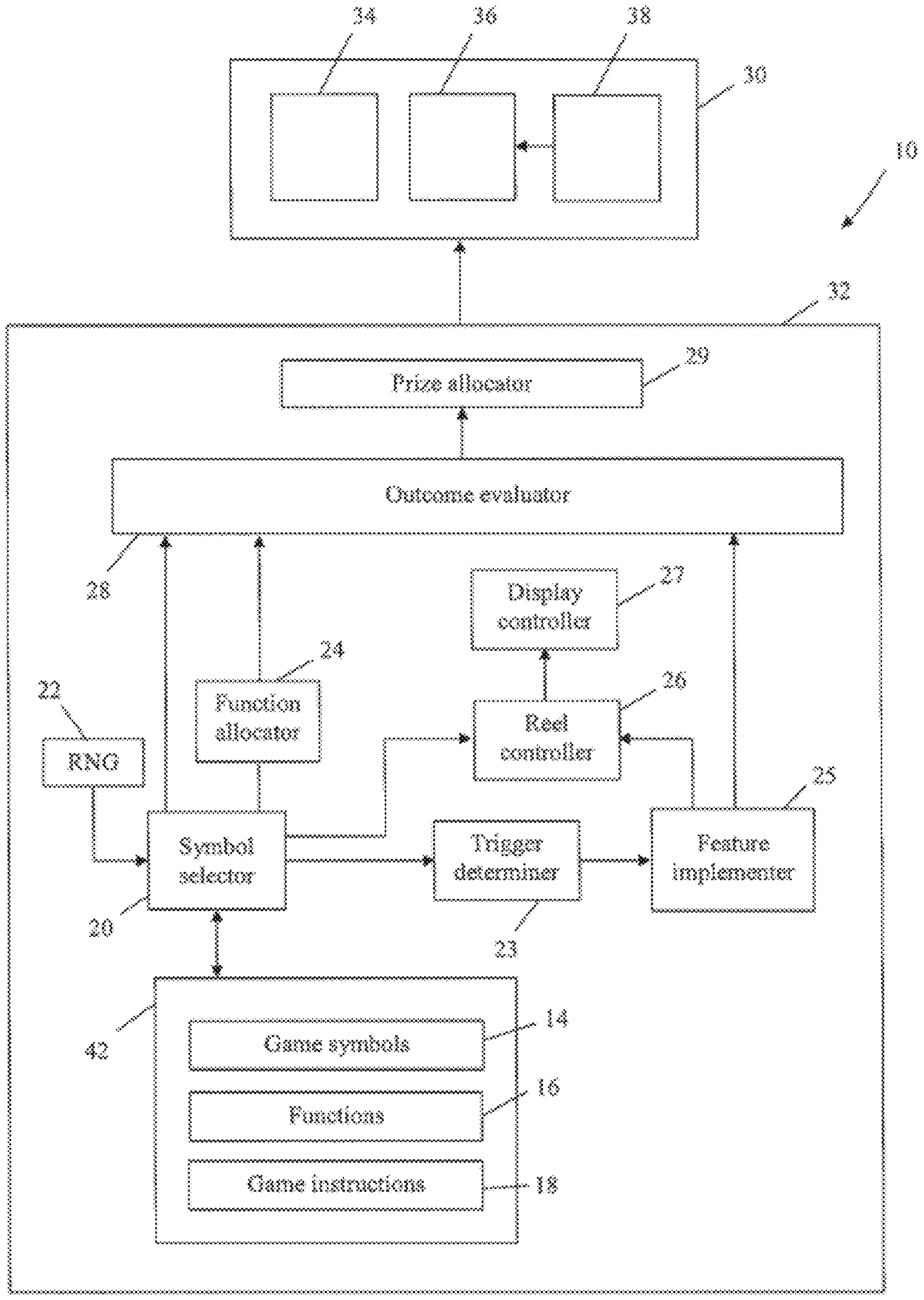
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols for use during implementation of a base game and a feature game, function data 16 indicative of one or more functions allocatable to the symbols, and game instruction data 18 usable by the gaming machine 10 to control operation of the game.

The game controller 32 includes a symbol selector 20 which is arranged to select several symbols from the stored symbols 14 for display to a player. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

In the present example, the gaming system 10 is operable in normal game mode wherein a base game using symbol bearing reels is implemented and special game mode wherein a feature game using symbol bearing reels is implemented. Special game mode is arranged to commence based on occurrence of a trigger condition. For this purpose, the game controller 32 also comprises a trigger determiner 23 arranged to determine whether a trigger condition exists and to commence special game mode when the trigger condition is detected.

In this example, the game controller 32 also comprises a function allocator 24 arranged to select and allocate one or more functions to one or more symbols. Such functions include a wild function, a scatter function, or any other function which may be applied to a symbol or to the game.

When a trigger condition is detected and special game mode commences, a feature implementer 25 implements a feature game which may be a modified version of the base game or a different game using rotatable symbol bearing reels.

The feature implementer 25 communicates with a reel controller 26 arranged to control reel positions and reel movement in association with a display controller 27. In response to instructions from the feature implementer 25, the reel controller 26 in association with the display controller 27 causes the reels to rotate so as to move directly to the reel stop positions corresponding to display of the selected symbols. As such, each reel rotates less than one full revolution to the selected stop position in order to display a selected symbol.

The game controller 32 also comprises an outcome evaluator 28 which in accordance with the game instructions 18 determines game outcomes in this example based on the symbols selected for display to a player by the symbol selector 20, and a prize allocator 29 arranged to allocate prizes based on the game outcomes.

In the embodiments described below, the symbol selector 20, the trigger determiner 23, the feature implementer 25, the function allocator 24, the reel controller 26, and the outcome evaluator 28 are at least partly implemented using the processor 40 and associated software, although it will be understood that other implementations are envisaged.

The gaming system 10 can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to play audible and/or display visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
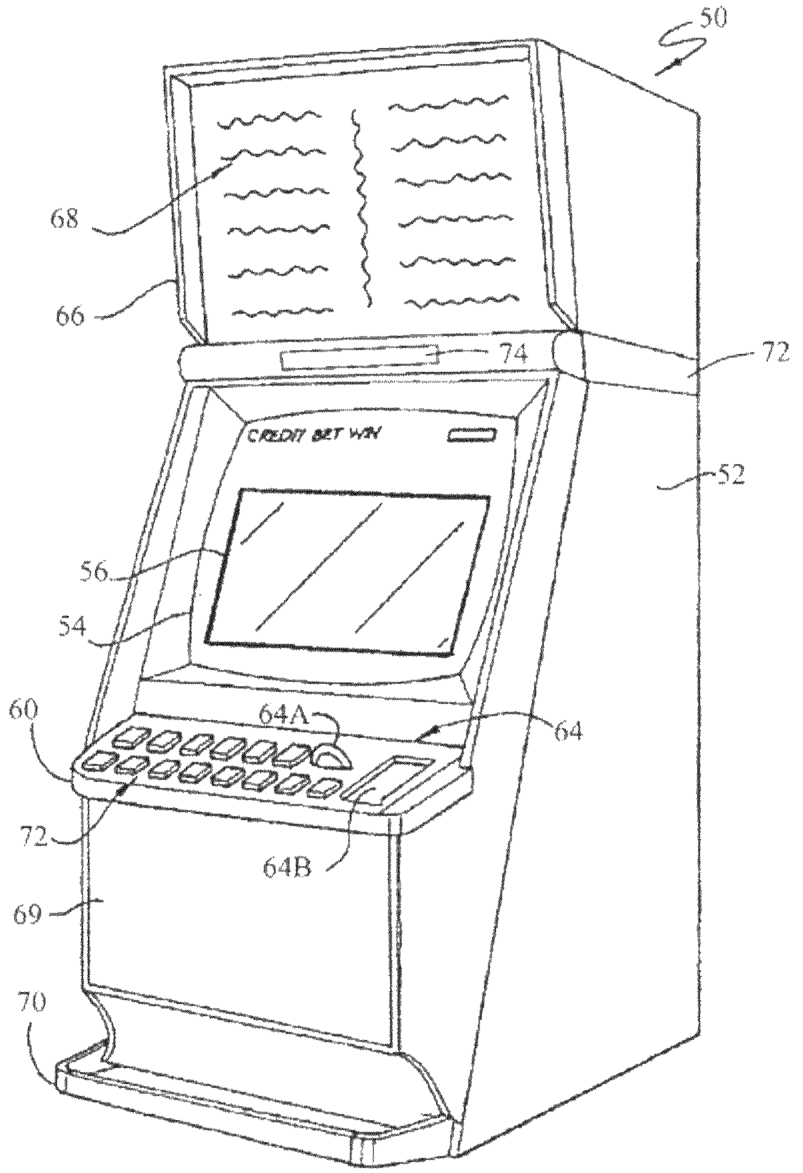
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type.

The display 54 in this example is arranged to display representations of several reels, each reel of which has several associated symbols. Typically 3, 4 or 5 reels are provided. During operation of the game, the reels first appear to rotate then stop with typically three symbols visible on each reel.

A player marketing module (PMM) 72 having a display 4 is connected to the gaming machine 10. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 72 is a Sentinel III device produced by Aristocrat Technologies Pty Ltd.

Figure 4:
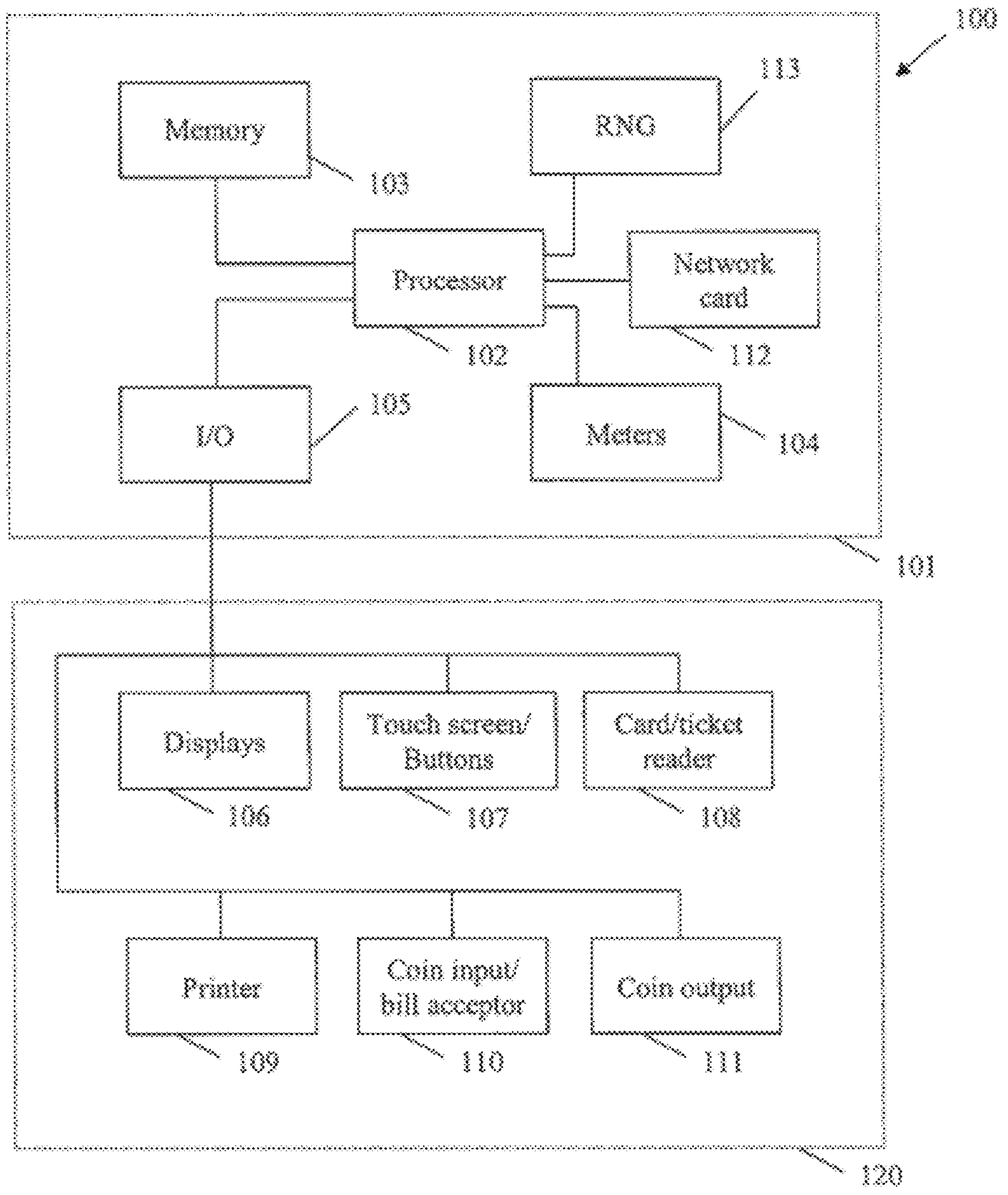
FIG. 4 is a schematic block diagram of operative components of the gaming machine shown in FIG. 3.

FIG. 4 shows a block diagram of operative components of a typical gaming machine 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
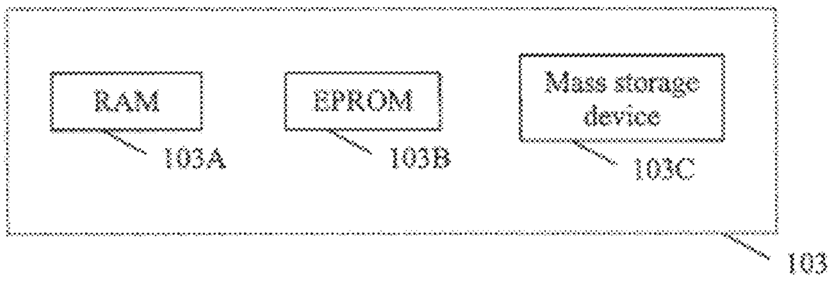
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM

103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
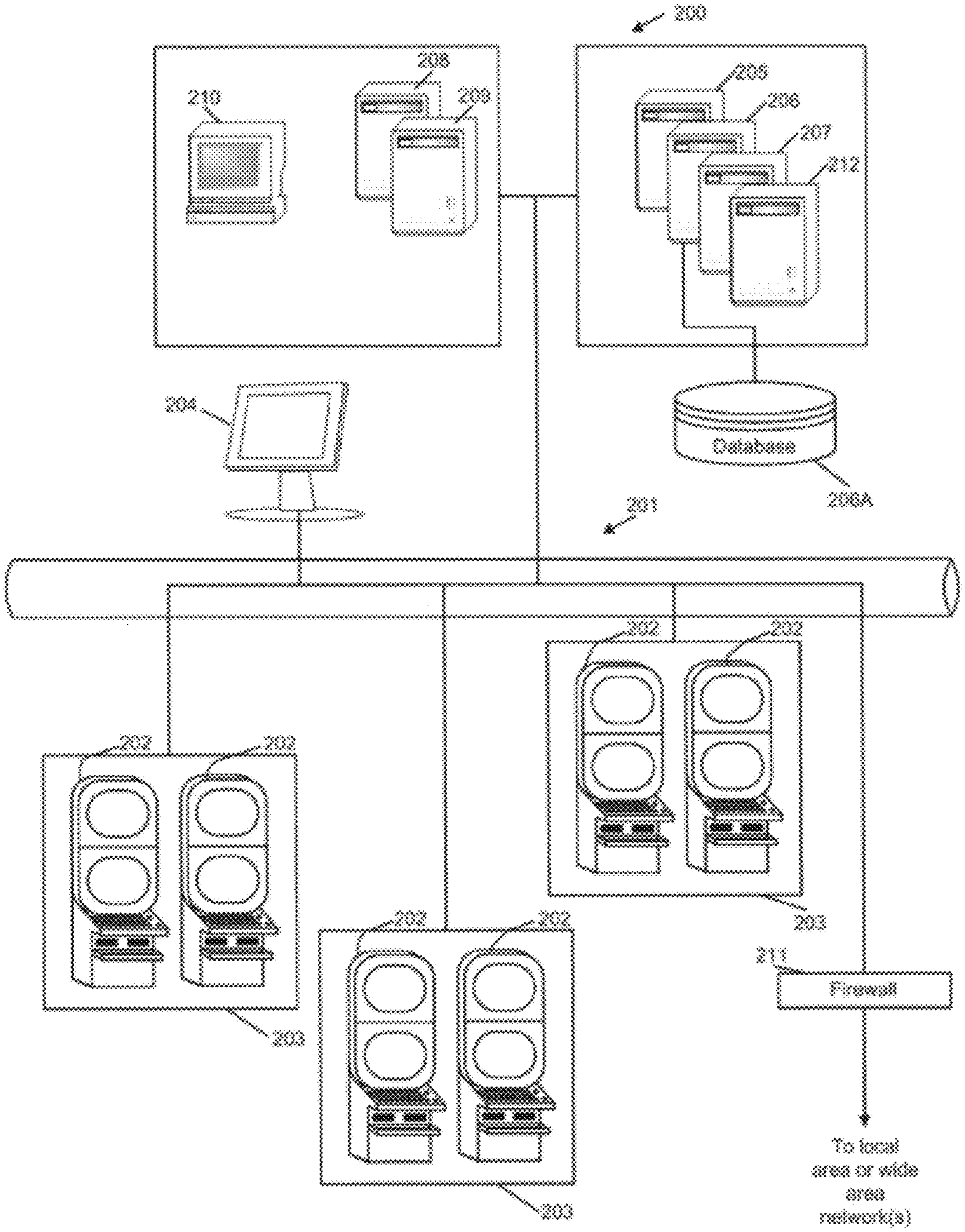
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Figure 7:
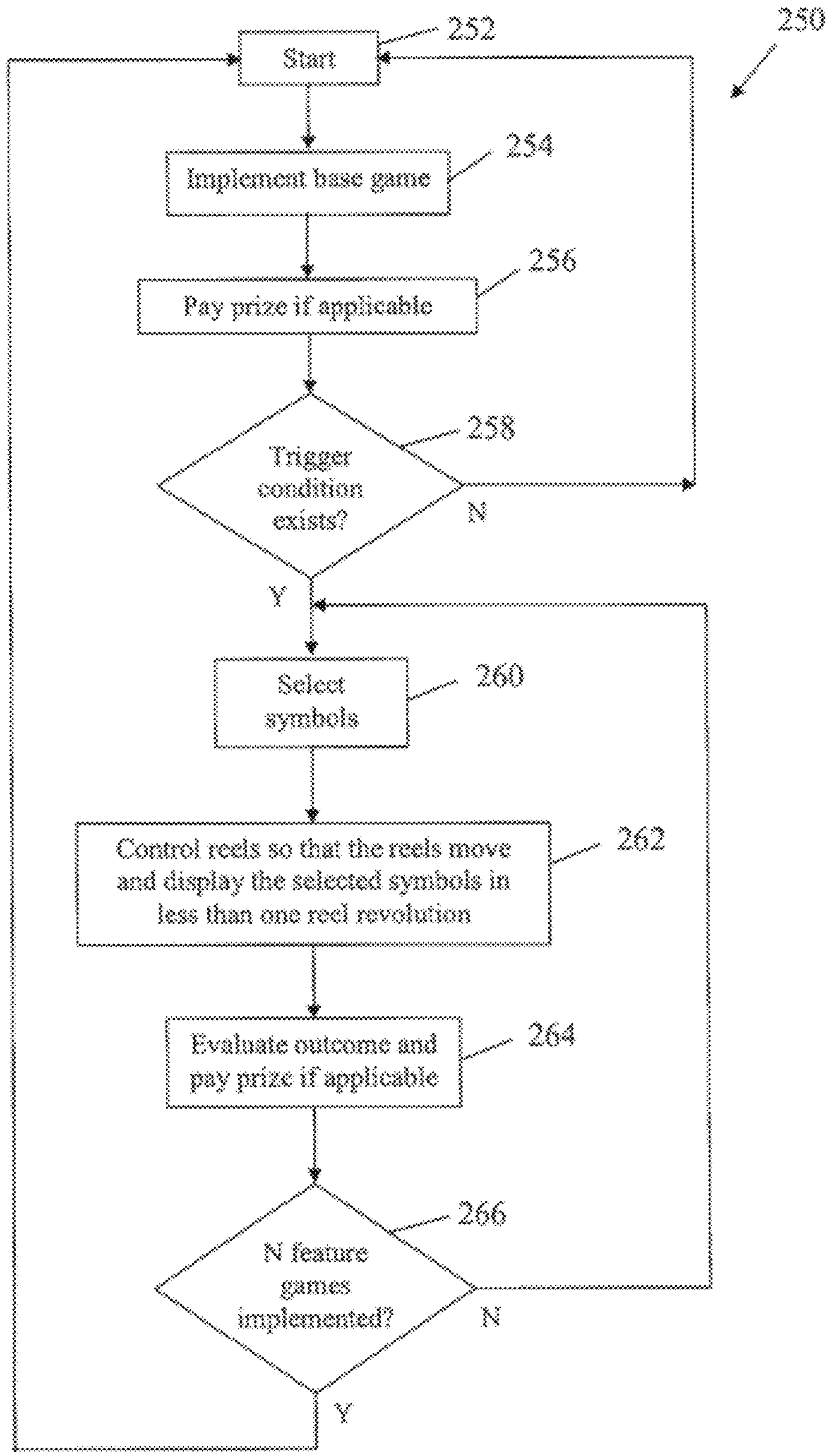
FIG. 7 is a flow diagram illustrating a method of gaming in accordance with an embodiment of the present invention.
Figure 9:
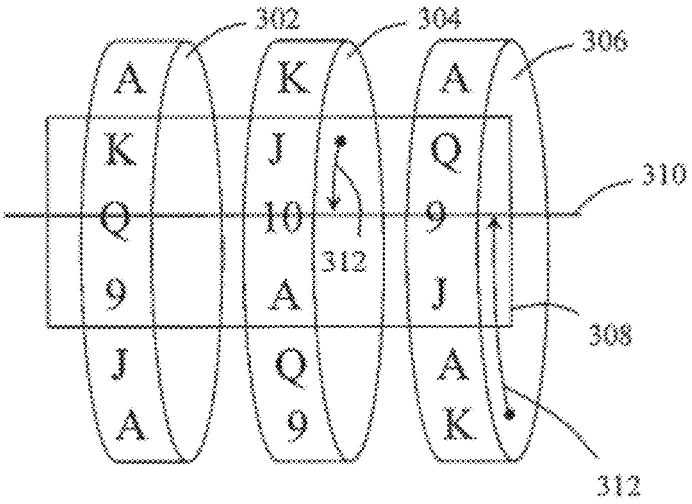
FIG. 9 is a diagrammatic representation of the reels shown in FIG. 8 and showing required rotation of the reels in order to display symbols selected in a subsequent game.
Figure 10:
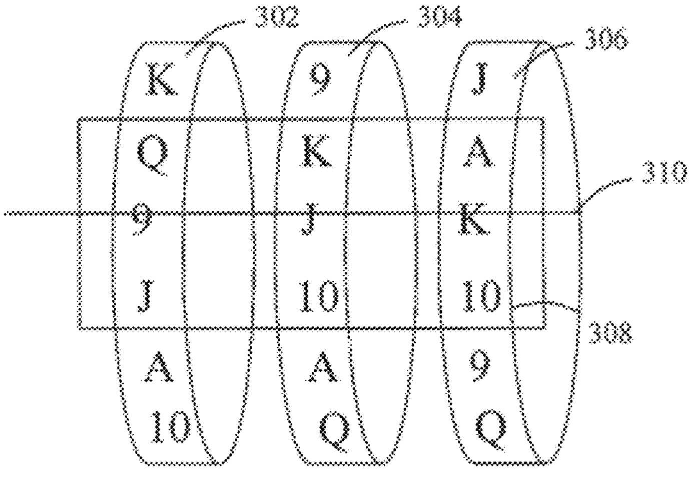
FIG. 10 is a diagrammatic representation of the reels shown in FIGS. 8 and 9 and showing the selected symbols during the subsequent game after rotation of the reels according to the required rotation shown in FIG. 9.

Examples of specific implementations of the gaming system will now be described with reference to flow diagram 250 shown in FIG. 7, which illustrates steps 252 to 266 of a method of gaming implemented by the gaming system, and FIGS. 8 to 10.

In one embodiment, the gaming system is operable in a first mode wherein the reels are not controlled so as rotate less than one full revolution and a second mode wherein the reels are controlled so as rotate less than one full revolution. The first and second modes may correspond to normal game mode wherein a base game is implemented and special game mode wherein a feature game is implemented. Alternatively, the first and second mode may occur during any game and may commence in response to player input or in response to a game condition with the game implemented during the first and second game modes being essentially the same.

The base game and the feature game are of a type including multiple rotatable reels, which may be physical reels or virtual reels, with each reel having a plurality of symbols and optionally one or more function symbols. Win outcomes are determined on the basis of the symbols visible when the reels stop rotating, and in this example three symbols are displayed on each reel at any time. A win outcome may occur based on display of the same symbol along normal win lines which may extend horizontally, diagonally, or in any other predefined continuous line. A win outcome may also occur based on display of multiple scattered symbols at any display location. A win outcome may also occur on the basis of one or more standard symbols in combination with at least one function symbol having an assigned function. For example a function symbol may correspond to a wild function, a scatter function, a multiply function, a repeat win function, and so on.

During a base game, win outcomes are determined on the basis of the symbols displayed on the reels after the reels have stopped rotating. During a feature game, one or more modifications may be made to the base game to change the operation or appearance of the base game, or a different game entirely to the base game may be implemented. For example, in one feature game, the symbol set from which the displayed symbols are selected may be substituted for another symbol set different to the first symbol set.

The gaming system is arranged to commence special game mode when a trigger condition exists 258, in this example when a predetermined game outcome occurs such as when a specific combination of symbols is displayed such as scattered CAT symbols.

In the present example, 3 reels are provided and during a feature game symbols are selected and displayed on first second and third reels 302, 304, 306 respectively in a display area 308. In this example, the actual selected symbols are shown on a central display line 310 with the reel controller 26 being arranged to cooperate with the display controller 27 so as to spin the reels and stop the reels at stop positions such that the selected symbols are shown on the central display line 310.

Figure 8:
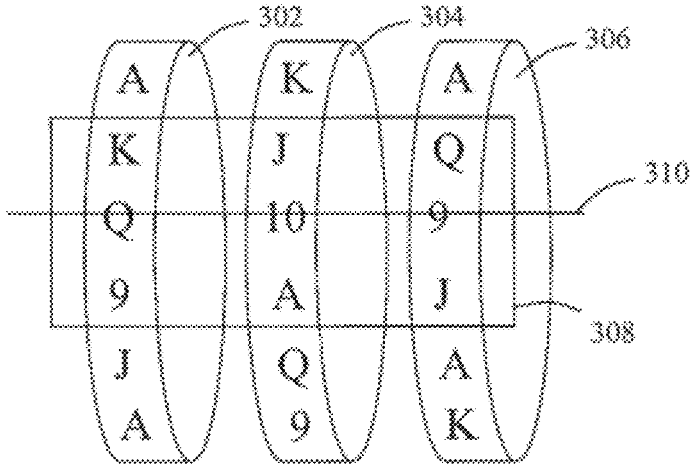
FIG. 8 is a diagrammatic representation of reels of a gaming system showing symbols displayed in a display area after selection of symbols during implementation of a game.

As shown in FIG. 8, after completion of a first feature game, the symbols shown by the first, second and third reels on the central display line 310 are Q, 10 and 9 symbols.

In a subsequent feature game, symbols are selected, for example by the symbol selector 20 in association with the random number generator 22, and the reel controller 26 in association with the display controller 27 causes the reels to rotate so that the reels move directly to stop positions whereby the selected symbols are shown on the central display line 310. In the present example, the selected symbols are Q, J and K symbols. As shown by arrows 312 in FIG. 9, the first reel already shows a Q symbol so no rotation of the first reel 302 is required, the second reel 304 is required to move one stop position downward, and the third reel 306 is required to move 3 stop positions upward. The symbols shown on the reels after movement of the reels as indicated in FIG. 9 is shown in FIG. 10.

In this example, the reels are simultaneously controlled so as to display the selected symbols with each reel simultaneously moving (if required) to the desired stopping position to display a selected symbol. However, it will be understood that other arrangements are possible. For example, the reels may be controlled so as to move sequentially to the desired stopping position in a defined sequence such as left to right or in a randomly determined sequence.

The reels are then evaluated by the outcome evaluator 28 and a prize paid if applicable.

The above described process continues until all feature games have been implemented.

In the present example the reels are controlled so as to rotate the minimum amount in order to display the selected symbols, irrespective of whether the required rotation is up or down. However, it will be understood that other variations are possible. For example, the reels may be controlled so that all reels move in the same direction, or so that the direction of rotation is randomly determined.

While the above example is described in relation to a video implementation of a spinning reel type probabilistic game wherein virtual reels are shown on a display, it will be understood that other variations are possible. For example, the reels may be physical reels controlled by one or more stepper motors.

While the above example is described in relation to an arrangement whereby during a feature game the reels move less that one full revolution in order to display the selected symbols, it will be appreciated that other variations are possible. For example, the reels may be controlled to move less that one full revolution in order to display the selected symbols during both a feature game and a base game or only during a base game.

The gaming system may also be arranged such that instead of controlling the reels to move less that one full revolution in order to display the selected symbols in response to a trigger condition or other game related trigger, the reels may be controlled to operate in this way in response to player input such as in response to a button press by the player.

It will be appreciated that the present invention enables fast paced game play which may be desirable in some game circumstances.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A gaming system for play of a base game and a feature game, the gaming system comprising:

a plurality of rotatable reels, each reel comprising a plurality of selectable symbols corresponding to respective reel stopping positions;

a symbol selector configured to select a stopping position for each reel and thereby select at least one symbol from each reel;

a reel controller configured to control rotation of the reels such that the reels rotate during implementation of a game in order to move the reels to the selected stopping positions and thereby display the selected symbols in a display area;

wherein the reel controller is configured to control rotation of the reels in a base game mode for play of the base game wherein all reels are rotated more than one full rotation in order to move the reels to a selected stopping position, and a feature game mode for play of the feature game wherein all reels rotate less than one full rotation and each reel rotates in a randomly determined direction in order to move to a selected stopping position.

2. A gaming system as claimed in claim 1, wherein, in said feature game mode, the reel controller is configured to not rotate the reel if a reel already shows a selected symbol.

3. A gaming system as claimed in claim 1, wherein, in both the base game mode and the feature game mode, the reel controller is configured to control the reels to rotate the reels simultaneously.

4. A gaming system as claimed in claim 1, wherein, in both the base game mode and the feature game mode, the reel controller is configured to control the reels to rotate the reels in a defined sequence.

5. A gaming system as claimed in claim 4, wherein the defined sequence is randomly determined.

6. A gaming system as claimed in claim 1, wherein the reel controller is configured to operate in the feature game mode in response to a game condition occurring during the base game.

7. A gaming system as claimed in claim 6, wherein the game condition includes a display of at least one trigger symbol in the stopped position.

8. A gaming system as claimed in claim 7, wherein the game condition includes a display of a particular combination of trigger symbols in the stopped position.

9. A gaming system as claimed in claim 1, wherein the gaming system is implemented as a stand alone gaming machine.

10. A method of gaming for play of a base game and a feature game, using a plurality of rotatable reels, a game controller and a display device, each reel comprising a plurality of selectable symbols corresponding to respective reel stopping positions, comprising:

rotating the plurality of reels via the game controller;

selecting a stopping position for each reel via the game controller and thereby selecting via the display device at least one symbol from each reel;

controlling said rotating of the reels via the game controller such that the reels rotate in order to move the reels to the selected stopping positions and thereby displaying the selected symbols via the display device, and said controlling said rotating of the reels in a base game mode wherein all reels are rotated more than one full rotation in order to move the reels to a selected stopping position for play of the base game, and said controlling said rotating of the reels in a feature game mode wherein all reels rotate less than one full rotation and each in a randomly determined direction in order to move to a selected stopping position for play of the feature game.

11. A method as claimed in claim 10, wherein, in said feature game mode, said controlling said rotating of the reels so as to not rotate a reel if the reel already shows a selected symbol.

12. A method as claimed in claim 10, wherein, in both the base game mode and the feature game mode, said controlling said rotating of the reels to rotate in order to move to a selected stopping position includes rotating the reels simultaneously.

13. A method as claimed in claim 10, wherein, in both the base game mode and the feature game mode, said controlling said rotating of the reels to rotate in order to move to a selected stopping position includes rotating the reels in a defined sequence.

14. A method as claimed in claim 13, wherein the defined sequence is randomly determined.

15. A method as claimed in claim 10, wherein said controlling said rotating of the reels in the feature game mode to play the feature game includes responding to a game condition.

16. A method as claimed in claim 15, wherein the game condition is a trigger condition of display of at least one trigger symbol in the selected stopped position.

17. A method as claimed in claim 16, wherein the trigger condition is a display of a particular combination of trigger symbols in the selected stopped position.

18. A method as claimed in claim 10 wherein said rotatable reels are virtual reels displayable on the display device.

* * * * *